United States Patent
Purkayastha et al.

(10) Patent No.: US 12,262,254 B2
(45) Date of Patent: Mar. 25, 2025

(54) HANDLING OF CONDITIONAL HANDOVER AND CONDITIONAL PRIMARY SECONDARY CELL CHANGE

(71) Applicant: QUALCOMM Incorporated, San Diego, CA (US)

(72) Inventors: Punyaslok Purkayastha, San Diego, CA (US); Ozcan Ozturk, San Diego, CA (US); Aziz Gholmieh, Del Mar, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 17/457,177

(22) Filed: Dec. 1, 2021

(65) Prior Publication Data
US 2022/0322171 A1   Oct. 6, 2022

Related U.S. Application Data

(60) Provisional application No. 63/168,744, filed on Mar. 31, 2021.

(51) Int. Cl.
*H04W 76/30* (2018.01)
*H04W 36/00* (2009.01)
*H04W 36/36* (2009.01)

(52) U.S. Cl.
CPC ... *H04W 36/0033* (2013.01); *H04W 36/0058* (2018.08); *H04W 36/00838* (2023.05); *H04W 36/362* (2023.05); *H04W 76/30* (2018.02); *H04W 36/00698* (2023.05)

(58) Field of Classification Search
None
See application file for complete search history.

(56) References Cited

U.S. PATENT DOCUMENTS

| | | |
|---|---|---|
| 2018/0352491 A1 | 12/2018 | Shih et al. |
| 2021/0400748 A1 | 12/2021 | Subramanian et al. |
| 2022/0256411 A1* | 8/2022 | Liu .................. H04W 36/00698 |
| 2022/0394583 A1* | 12/2022 | Deenoo ............. H04W 74/0841 |

(Continued)

OTHER PUBLICATIONS

Catt (Rapporteur): "Report on Email Discussion [107b#52] [NR MobE] Open Issues Conditional PSCell Addition/Change (CATT)", 3GPP TSG-RAN WG2 Meeting #108, R2-1915962, 3rd Generation Partnership Project, Mobile Competence Centre, 650, Route Des Lucioles, F-06921 Sophia-Antipolis Cedex, France, vol. RAN WG2, No. Reno, USA, Nov. 18, 2019-Nov. 22, 2019 Nov. 8, 2019, XP051817520, 46 Pages.

(Continued)

*Primary Examiner* — Anez C Ebrahim
(74) *Attorney, Agent, or Firm* — Harrity & Harrity, LLP

(57) ABSTRACT

Various aspects of the present disclosure generally relate to wireless communication. In some aspects, a user equipment (UE) may initiate one of a conditional handover (CHO) procedure or a conditional primary secondary cell addition/change (CPAC) procedure. The UE may perform a response action with regard to a configuration of the other of the CHO procedure or the CPAC procedure based at least in part on initiating the one of the CHO procedure or the CPAC procedure. Numerous other aspects are described.

30 Claims, 13 Drawing Sheets

(56) References Cited

U.S. PATENT DOCUMENTS

2023/0078307 A1\* 3/2023 Zhang ................ H04W 36/362
  370/331
2023/0300708 A1 9/2023 Leng et al.
2023/0345315 A1\* 10/2023 Wu ..................... H04W 36/362

OTHER PUBLICATIONS

International Search Report and Written Opinion—PCT/US2022/070876—ISA/EPO—Jun. 7, 2022.
Lenovo, et al., "Issues on Inter-SN CPC", 3GPP TSG-RAN WG2 Meeting #112e, R2-2009868, 3rd Generation Partnership Project, Mobile Competence Centre, 650, Route Des Lucioles, F-06921 Sophia-Antipolis Cedex, France, vol. RAN WG2, No. Online, Nov. 2, 2020-Nov. 13, 2020 Oct. 23, 2020, XP051942670, 3 Pages.
Qualcomm Incorporated: "Avoiding Simultaneous CHO and CPC", 3GPP TSG-RAN WG3 Meeting #107-bis-e, R3-201798, 3rd Generation Partnership Project, Mobile Competence Centre, 650, Route Des Lucioles, F-06921 Sophia-Antipolis Cedex, France, vol. RAN WG3, No. Online Meeting, Apr. 20, 2020-Apr. 30, 2020, Apr. 10, 2020, 2 Pages, XP051873771.
Qualcomm Incorporated: "Avoiding Simultaneous CHO and CPC", 3GPP TSG-RAN WG3 Meeting #108-e, R3-203330, 3rd Generation Partnership Project, Mobile Competence Centre, 650, Route Des Lucioles, F-06921 Sophia-Antipolis Cedex, France, vol. RAN WG3, No. E-meeting, Jun. 1, 2020-Jun. 12, 2020 May 22, 2020, XP051889184, 3 Pages.

\* cited by examiner

HANDLING OF CONDITIONAL HANDOVER AND CONDITIONAL PRIMARY SECONDARY CELL CHANGE

CROSS-REFERENCE TO RELATED APPLICATION

This patent application claims priority to U.S. Provisional Patent Application No. 63/168,744, filed on Mar. 31, 2021, entitled "HANDLING OF CONDITIONAL HANDOVER AND CONDITIONAL PRIMARY SECONDARY CELL CHANGE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for handling of conditional handover (CHO) and conditional primary secondary cell addition (CPA) or conditional primary secondary cell change (CPC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: initiate one of a conditional handover (CHO) procedure or a conditional primary secondary cell addition/change (CPAC) procedure; and perform a response action with regard to a configuration of the other of the CHO procedure or the CPAC procedure based at least in part on initiating the one of the CHO procedure or the CPAC procedure.

In some aspects, a wireless node for wireless communication includes a memory and one or more processors, coupled to the memory, configured to: perform one of a CHO procedure or a CPAC procedure; and perform a response action with regard to a configuration of the other of the CHO procedure or the CPAC procedure based at least in part on performing the one of the CHO procedure or the CPAC procedure.

In some aspects, a non-transitory computer-readable medium storing a set of instructions for wireless communication includes one or more instructions that, when executed by one or more processors of a UE, cause the UE to: initiate one of a CHO procedure or a CPAC procedure; and perform a response action with regard to a configuration of the other of the CHO procedure or the CPAC procedure based at least in part on initiating the one of the CHO procedure or the CPAC procedure.

In some aspects, a non-transitory computer-readable medium storing a set of instructions for wireless communication includes one or more instructions that, when executed by one or more processors of a wireless node, cause the wireless node to: perform one of a CHO procedure or a CPAC procedure; and perform a response action with regard to a configuration of the other of the CHO procedure or the CPAC procedure based at least in part on performing the one of the CHO procedure or the CPAC procedure.

In some aspects, an apparatus for wireless communication includes means for initiating one of a CHO procedure or a CPAC procedure; and means for performing a response action with regard to a configuration of the other of the CHO procedure or the CPAC procedure based at least in part on initiating the one of the CHO procedure or the CPAC procedure.

In some aspects, an apparatus for wireless communication includes means for performing one of a CHO procedure or a CPAC procedure; and means for performing a response action with regard to a configuration of the other of the CHO procedure or the CPAC procedure based at least in part on performing the one of the CHO procedure or the CPAC procedure.

In some aspects, a method of wireless communication performed by a UE includes initiating one of a CHO procedure or a CPAC; and performing a response action with regard to a configuration of the other of the CHO procedure or the CPAC procedure based at least in part on initiating the one of the CHO procedure or the CPAC procedure.

In some aspects, a method of wireless communication performed by a wireless node includes initiating one of a CHO procedure or a CPAC procedure; and performing a response action with regard to a configuration of the other of the CHO procedure or the CPAC procedure based at least in part on initiating the one of the CHO procedure or the CPAC procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
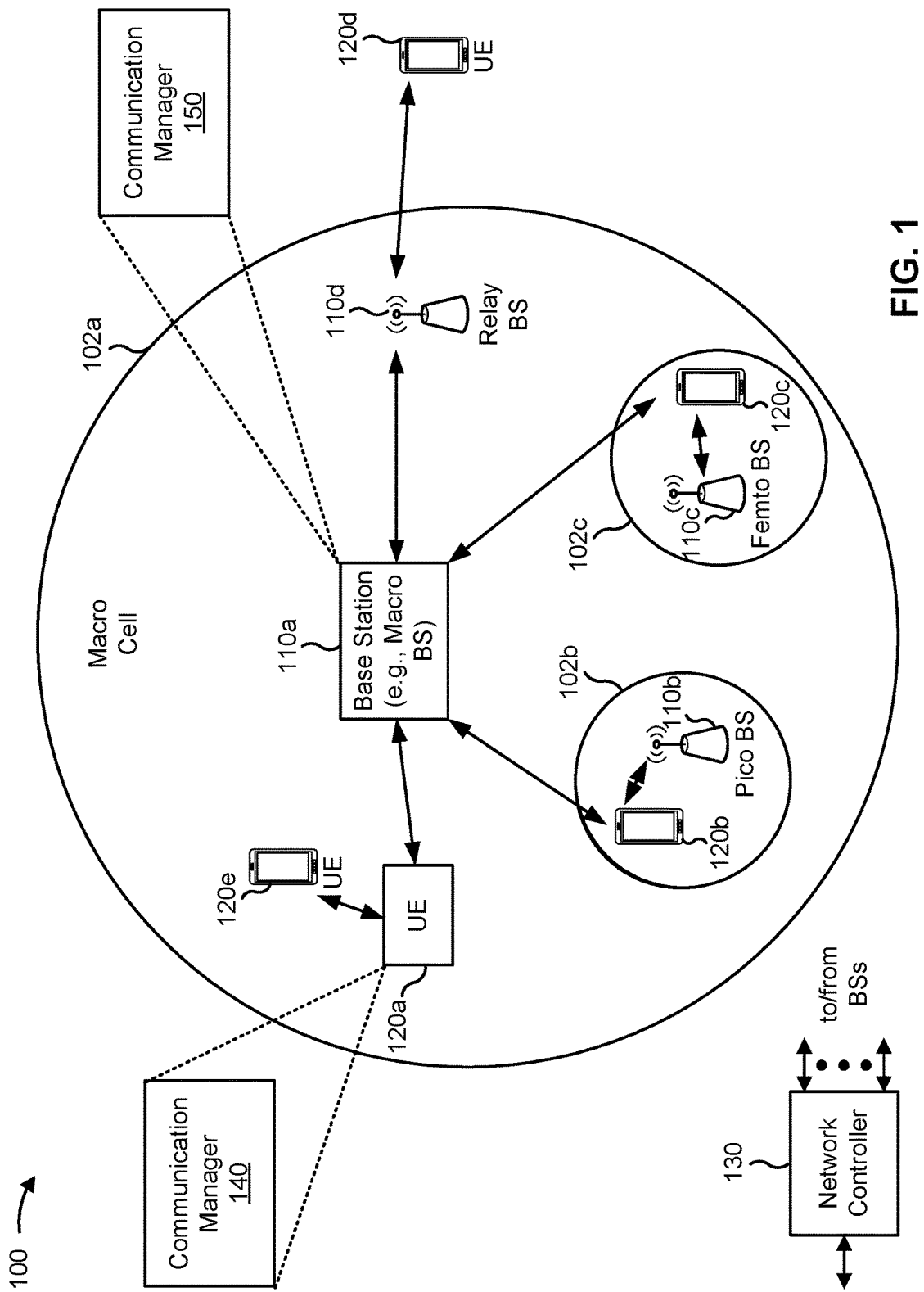
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may initiate one of a conditional handover (CHO) procedure or a conditional primary secondary cell addition/change (CPAC) procedure; and perform a response action with regard to a configuration of the other of the CHO procedure or the CPAC procedure based at least in part on initiating the one of the CHO procedure or the CPAC procedure. Additionally, or alternatively, the communication manager 140 may perform one or more other operations described herein.

In some aspects, a wireless node (e.g., a base station 110 or a core network device associated therewith) may include a communication manager 150. As described in more detail elsewhere herein, the communication manager 150 may perform one of a CHO procedure or a CPAC procedure; and perform a response action with regard to a configuration of the other of the CHO procedure or the CPAC procedure based at least in part on performing the one of the CHO procedure or the CPAC procedure. Additionally, or alternatively, the communication manager 150 may perform one or more other operations described herein.

As indicated above, FIG. 1 is provided as an example. Other examples may differ from what is described with regard to FIG. 1.

Figure 2:
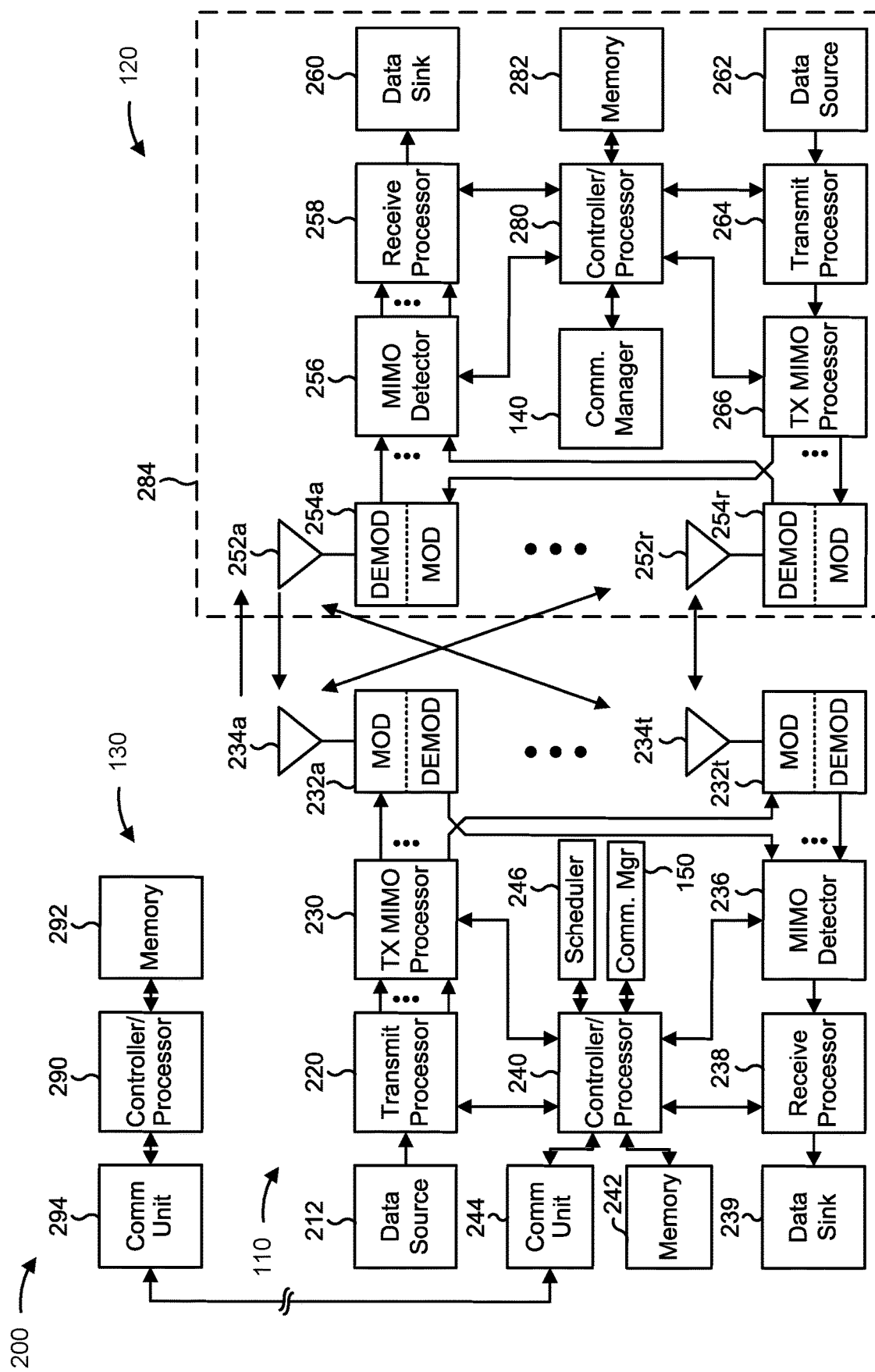
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with handling of CHO and CPAC, as described, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for initiating one of a CHO procedure or a CPAC procedure; and/or means for performing a response action with regard to a configuration of the other of the CHO procedure or the CPAC procedure based at least in part on initiating the one of the CHO procedure or the CPAC procedure. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a wireless node (e.g., the base station 110) includes means for performing one of a CHO procedure or a CPAC procedure; and/or means for performing a response action with regard to a configuration of the other of the CHO procedure or the CPAC procedure based at least in part on performing the one of the CHO procedure or the CPAC procedure. In some aspects, the means for the wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A CHO procedure, such as is defined in 3GPP Technical Specification (TS) 38.300, Section 9.2.3.4 version 16.4.0 and elsewhere, may be used to improve handover robustness. For example, allowing UEs to perform CHO procedures may reduce a likelihood of a failure occurrence when a UE is moving between cells. In a CHO procedure, a UE and a BS may communicate to identify a plurality of target cells to which to handover and a BS may transmit a handover command to the UE when network conditions are relatively good, thereby reducing a likelihood that degraded network conditions cause a failure associated with the handover command. Then, the UE may autonomously detect a satisfaction of the failure command (e.g., as a result of deteriorating network conditions) and implement the handover command that was already sent by the BS.

A conditional primary secondary cell addition (CPA) procedure or a conditional primary secondary cell change (CPC) procedure, which may be collectively termed a "conditional primary secondary cell addition/change (CPAC) procedure", such as is defined in 3GPP TS 37.340 Section 10.6 version 16.3.0, may similarly be used to improve cell addition or change robustness. For example, allowing UEs to perform CPAC procedures may reduce a likelihood of a failure occurrence when adding or changing primary secondary cells. In a CPAC procedure, a UE may communicate with a set of BSs (e.g., a source master node or a source secondary node, among other examples) to pre-emptively identify and prepare resources associated with target secondary nodes for one or more target master nodes.

However, in some cases, a CHO configuration may conflict with a CPAC configuration. For example, when a UE has a CHO configuration and a CPAC configuration and detects an event triggering a CHO procedure or a CPAC procedure, behavior associated with the other of the CHO procedure or the CPAC procedure may conflict with the CHO procedure or the CPAC procedure. In other words, when a CHO procedure is triggered, behavior of a CPAC procedure may conflict with behavior associated with the CHO procedure. Similarly, when a CPAC procedure is triggered, behavior of a CHO procedure may conflict with behavior of the CPAC procedure. As a result, errors in UE operation may arise and network resources may be wasted.

Some aspects described herein provide handling of CHO procedures and CPAC procedures and configurations associated therewith when a UE is configured with both a CHO configuration and a CPAC configuration. For example, some aspects described herein provide handling when a CPAC procedure is triggered before a CHO procedure, a CHO procedure is triggered before a CPAC procedure, or a CHO procedure and a CPAC procedure are triggered concurrently. In this way, the UE may avoid errors, thereby avoiding wasting of network resources as a result of the errors.

Figure 3:
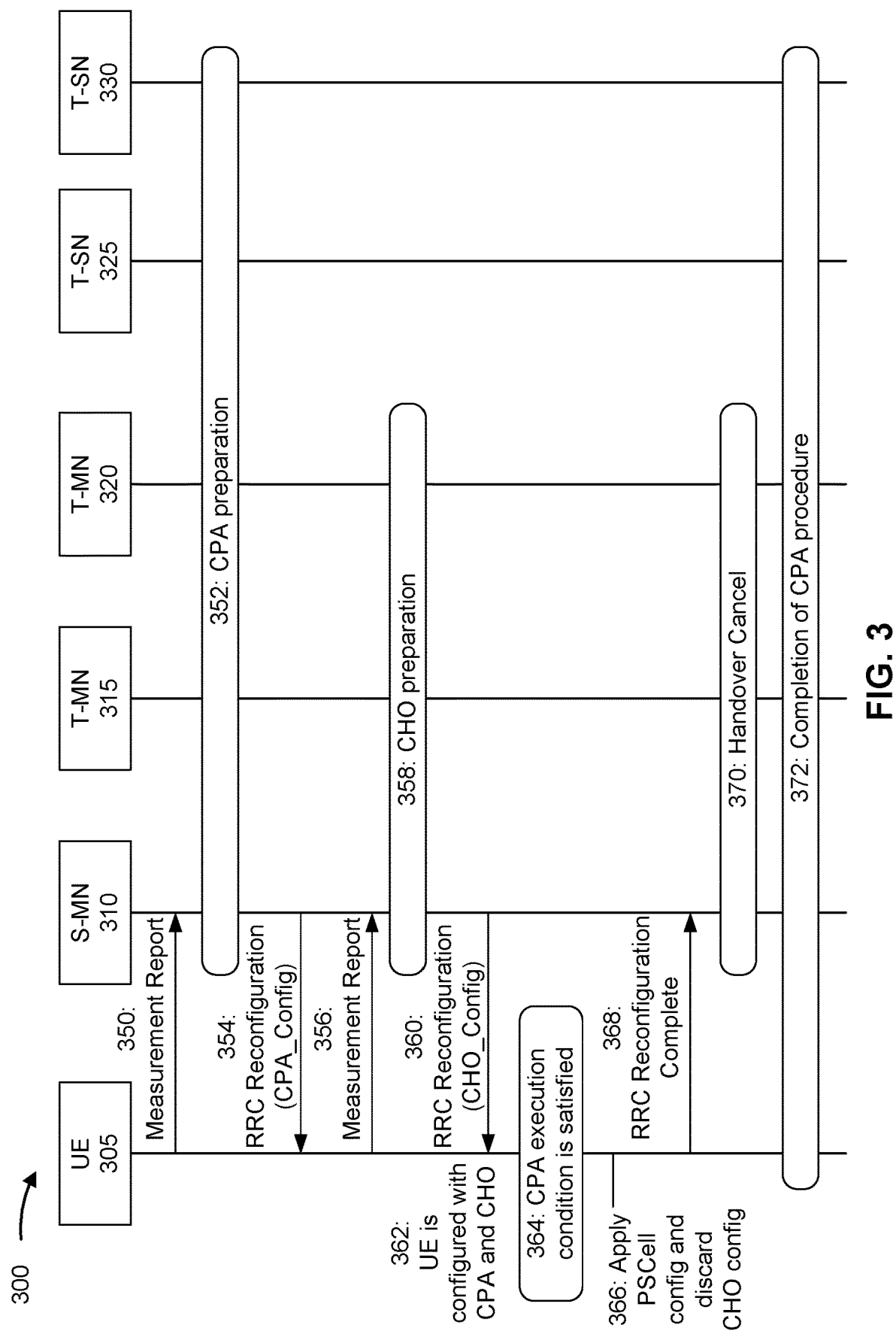
FIGS. 3-9 are diagrams illustrating examples associated with handling of conditional handover (CHO) and conditional primary cell addition/change (CPAC), in accordance with the present disclosure.

FIG. 3 is a diagram illustrating an example 300 associated with handling of CHO and CPAC, in accordance with the present disclosure. As shown in FIG. 3, a UE 305, a source master node (S-MN) 310, a first target master node (T-MN) 315, a second T-MN 320, a first target secondary node (T-SN) 325, and a second T-SN 330 may communicate with each other.

As shown by reference number 350, UE 305 may transmit a measurement report to S-MN 310. For example, UE 305 may transmit a measurement report associated with triggering a CPA procedure. Although some aspects are described herein in terms of a CPA procedure, aspects described herein may, depending on the context, be applicable to a CPC procedure or another conditional primary secondary cell procedure. Similarly, although some aspects are described herein in terms of a CPC procedure, aspects described herein may, depending on the context, be applicable to a CPA procedure or another conditional primary secondary cell procedure.

As shown by reference number 352, S-MN 310, T-MNs 315 and 320, and T-SNs 325 and 330 may communicate to prepare for the CPA procedure.

As shown by reference number 354, S-MN 310 may transmit a reconfiguration message to UE 305. For example, S-MN 310 may transmit a radio resource control (RRC) reconfiguration message that includes a CPA configuration based at least in part on preparing for the CPA procedure.

As shown by reference number 356, UE 305 may transmit a measurement report to S-MN 310. For example, UE 305 may transmit a measurement report associated with triggering a CHO procedure.

As shown by reference number 358, S-MN 310 and T-MNs 315 and 320 may communicate to prepare for the CHO procedure. For example, S-MN 310 may identify a set of T-MNs (e.g., T-MNs 315 and 320) to which UE 305 may handover when UE 305 detects satisfaction of a handover condition.

As shown by reference number 360, S-MN 310 may transmit a reconfiguration message to UE 305. For example, S-MN 310 may transmit an RRC reconfiguration message including a CHO configuration based at least in part on preparing for the CHO procedure. As shown by reference number 362, based at least in part on receiving the reconfiguration messages from S-MN 310 with the CPA configuration and CHO configuration, UE 305 may store CPA configuration information and CHO configuration information and monitor for satisfaction of a condition associated with triggering a CPA procedure or a CHO procedure.

As shown by reference number 364, UE 305 may determine that a CPA execution condition is satisfied. For example, UE 305 may determine to trigger a CPA procedure to add a target primary secondary cell (T-PSCell). As shown by reference number 366, UE 305 may apply a configuration associated with the T-PSCell and may discard the CHO configuration. For example, UE 305 may apply a T-PSCell configuration, which may be included in the CPA configuration information, and may discard the CHO configuration information to avoid a conflict between subsequent CPA procedures and CHO procedures that could be triggered during the CPA procedures.

As shown by reference number 368, UE 305 may transmit an RRC reconfiguration complete message to S-MN 310. For example, based at least in part on applying the T-PSCell configuration, of the CPA configuration information, UE 305 may transmit an RRC reconfiguration complete message, which may correspond to the RRC reconfiguration message that included the CPA configuration information. In this case, the RRC reconfiguration complete message may include information indicating that the CPA procedure is initiated with respect to a particular T-PSCell.

As shown by reference number 370, as a response to receiving the RRC reconfiguration complete message, S-MN 310 may communicate with first T-MN 315 and/or second T-MN 320 to cancel a handover associated with the CHO procedure. As shown by reference number 372, as another response to transmitting/receiving the RRC reconfiguration complete message, UE 305, S-MN 310, T-MNs 315 and 320, and T-SNs 325 and 330 may communicate to complete one or more further steps of the CPA procedure.

As indicated above, FIG. 3 is provided as an example. Other examples may differ from what is described with respect to FIG. 3.

Figure 4:
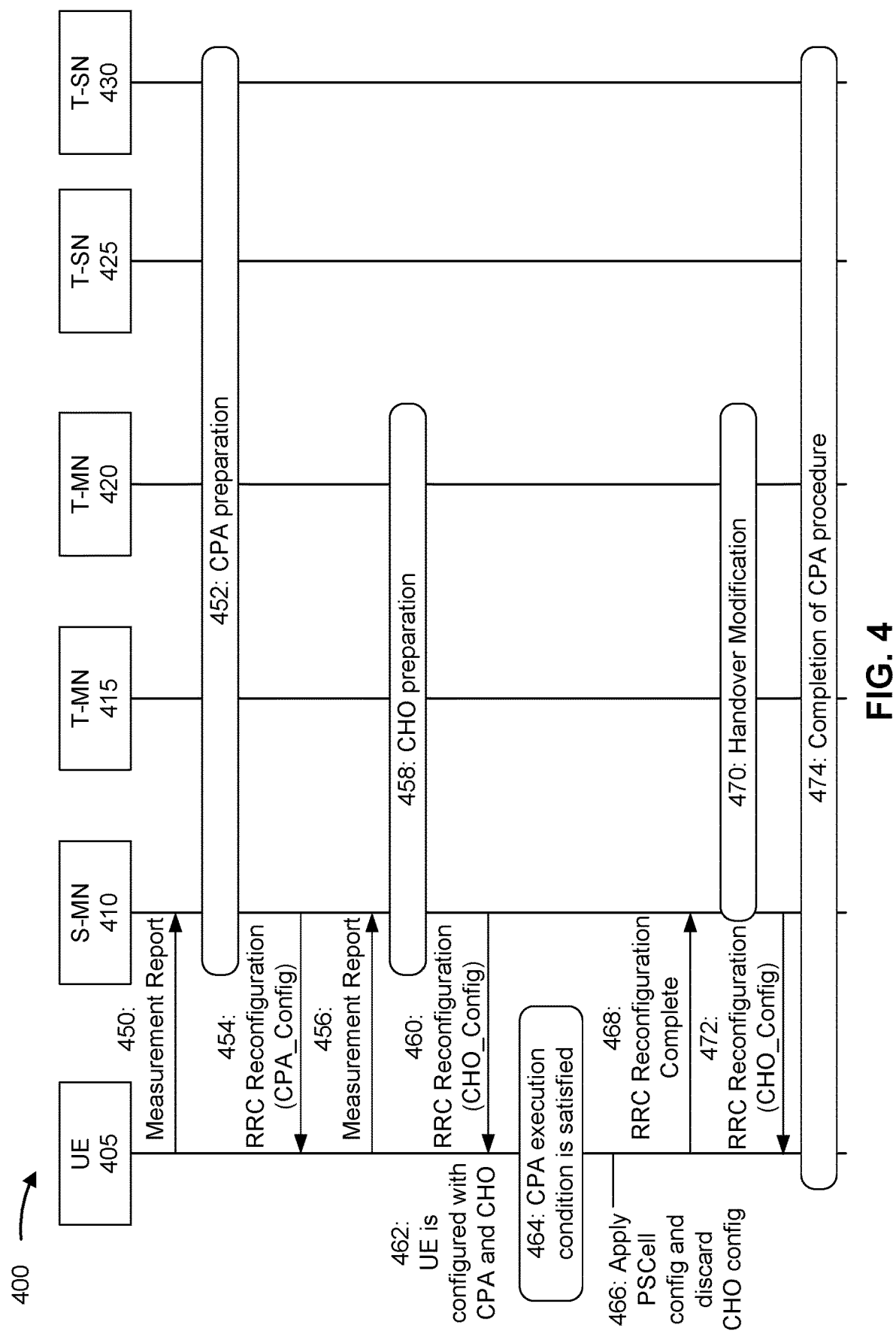

FIG. 4 is a diagram illustrating an example 400 associated with handling of CHO and CPAC, in accordance with the present disclosure. As shown in FIG. 4, a UE 405, an S-MN 410, a first T-MN 415, a second T-MN 420, a first target T-SN 425, and a second T-SN 430 may communicate with each other.

As shown by reference number 450, UE 405 may transmit a measurement report to S-MN 410. For example, UE 405 may transmit a measurement report associated with triggering a CPA procedure. As shown by reference number 452, S-MN 410, T-MNs 415 and 420, and T-SNs 425 and 430 may communicate to prepare for the CPA procedure. As shown by reference number 454, S-MN 410 may transmit a reconfiguration message to UE 405. For example, S-MN 410 may transmit an RRC reconfiguration message that includes a CPA configuration based at least in part on preparing for the CPA procedure.

As shown by reference number 456, UE 405 may transmit a measurement report to S-MN 410. For example, UE 405 may transmit a measurement report associated with triggering a CHO procedure. As shown by reference number 458, S-MN 410 and T-MNs 415 and 420 may communicate to prepare for the CHO procedure. For example, S-MN 410 may identify a set of T-MNs (e.g., T-MNs 415 and 420) to which UE 405 may handover when UE 405 detects satisfaction of a handover condition. As shown by reference number 460, S-MN 410 may transmit a reconfiguration message to UE 405. For example, S-MN 410 may transmit an RRC reconfiguration message including a CHO configuration based at least in part on preparing for the CHO procedure. As shown by reference number 462, based at least in part on receiving the reconfiguration messages from S-MN 410 with the CPA configuration and CHO configuration, UE 405 may store CPA configuration information and CHO configuration information and monitor for satisfaction of a condition associated with triggering a CPA procedure or a CHO procedure.

As shown by reference number 464, UE 405 may determine that a CPA execution condition is satisfied. For example, UE 405 may determine to trigger a CPA procedure to add a T-PSCell. As shown by reference number 466, UE 405 may apply a configuration associated with the T-PSCell and may discard the CHO configuration. For example, UE 405 may apply a T-PSCell configuration, which may be included in the CPA configuration information, and may keep the CHO configuration information to avoid a conflict between subsequent CPA procedures and CHO procedures that could be triggered during the CPA procedures. As shown by reference number 468, UE 405 may transmit an RRC reconfiguration complete message to S-MN 410. For example, based at least in part on applying the T-PSCell configuration, of the CPA configuration information, UE 405 may transmit an RRC reconfiguration complete message, which may correspond to the RRC reconfiguration message that included the CPA configuration information. In this case, the RRC reconfiguration complete message may include information indicating that the CPA procedure is initiated with respect to a particular T-PSCell.

As shown by reference number 470, as a response to receiving the RRC reconfiguration complete message, S-MN 410 may communicate with first T-MN 415 and/or second T-MN 420 to perform a handover modification procedure associated with the CHO procedure. For example, S-MN 410 may identify an updated CHO configuration and, as shown by reference number 472, provide an RRC reconfiguration message identifying the updated CHO configuration. As shown by reference number 474, as another response to transmitting/receiving the RRC reconfiguration complete message, UE 405, S-MN 410, T-MNs 415 and 420, and T-SNs 425 and 430 may communicate to complete one or more further steps of the CPA procedure.

As indicated above, FIG. 4 is provided as an example. Other examples may differ from what is described with respect to FIG. 4.

Figure 5:
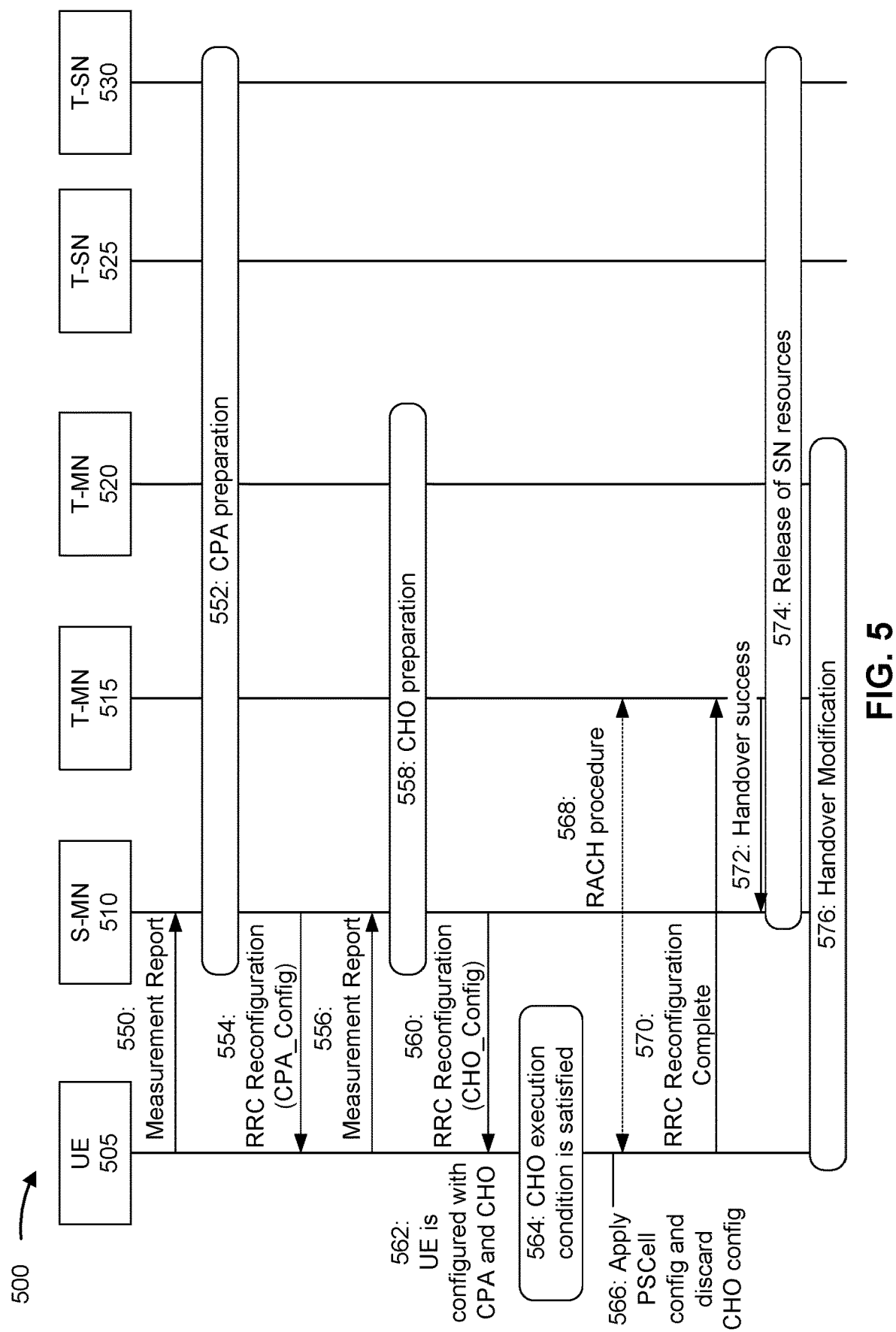

FIG. 5 is a diagram illustrating an example 500 associated with handling of CHO and CPAC, in accordance with the present disclosure. As shown in FIG. 5, a UE 505, an S-MN 510, a first T-MN 515, a second T-MN 520, a first T-SN 525, and a second T-SN 530 may communicate with each other.

As shown by reference number 550, UE 505 may transmit a measurement report to S-MN 510. For example, UE 505 may transmit a measurement report associated with triggering a CPA procedure. As shown by reference number 552, S-MN 510, T-MNs 515 and 520, and T-SNs 525 and 530 may communicate to prepare for the CPA procedure. As shown by reference number 554, S-MN 510 may transmit a reconfiguration message to UE 505. For example, S-MN 510 may transmit an RRC reconfiguration message that includes a CPA configuration based at least in part on preparing for the CPA procedure.

As shown by reference number 556, UE 505 may transmit a measurement report to S-MN 510. For example, UE 505 may transmit a measurement report associated with triggering a CHO procedure. As shown by reference number 558, S-MN 510 and T-MNs 515 and 520 may communicate to prepare for the CHO procedure. For example, S-MN 510 may identify a set of T-MNs (e.g., T-MNs 515 and 520) to which UE 505 may handover when UE 505 detects satisfaction of a handover condition. As shown by reference number 560, S-MN 510 may transmit a reconfiguration message to UE 505. For example, S-MN 510 may transmit an RRC reconfiguration message including a CHO configuration based at least in part on preparing for the CHO procedure. As shown by reference number 562, based at least in part on receiving the reconfiguration messages from S-MN 510 with the CPA configuration and CHO configuration, UE 505 may store CPA configuration information and CHO configuration information and monitor for satisfaction of a condition associated with triggering a CPA procedure or a CHO procedure.

As shown by reference number 564, UE 505 may determine that a CHO procedure execution condition is satisfied. For example, UE 505 may determine to trigger a CHO procedure to handover between master nodes. As shown by reference number 566, UE 505 may apply a configuration associated with a target primary cell (T-PCell) and may discard the CPA configuration. For example, UE 505 may apply a T-PCell configuration, which may be included in the CHO configuration information, and may discard the CPA configuration information to avoid a conflict between subsequent CHO procedures and CPA procedures that could be triggered during the CHO procedures.

As shown by reference number 568, UE 505 may communicate with first T-MN 515 to perform a random access channel (RACH) procedure on the T-PCell. For example, UE 505 may transmit a message to T-MN 515 to initiate a handover to the T-PCell. As shown by reference number 570, UE 505 may transmit an RRC reconfiguration complete message to S-MN 510. For example, based at least in part on applying the T-PCell configuration and performing the RACH procedure, UE 505 may transmit an RRC reconfiguration complete message, which may correspond to the RRC reconfiguration message that included the CHO configuration information. In this case, first T-MN 515 may indicate a handover success, as shown by reference number 572, to S-MN 510 as a result of the RACH procedure and receiving the RRC reconfiguration complete.

As shown by reference number 574, as a response to receiving the handover success message, S-MN 510 may communicate with T-MNs 515 and 520 and/or T-SNs 525 and 530 to release resources associated with the T-SNs 525 and 530 and the CPA procedure. As shown by reference number 576, as another response to transmitting/receiving the RRC reconfiguration complete message and the handover success message, UE 505, S-MN 510, and T-MNs 515 and 520 may communicate to complete one or more further steps of the CHO procedure.

As indicated above, FIG. 5 is provided as an example. Other examples may differ from what is described with respect to FIG. 5.

Figure 6:
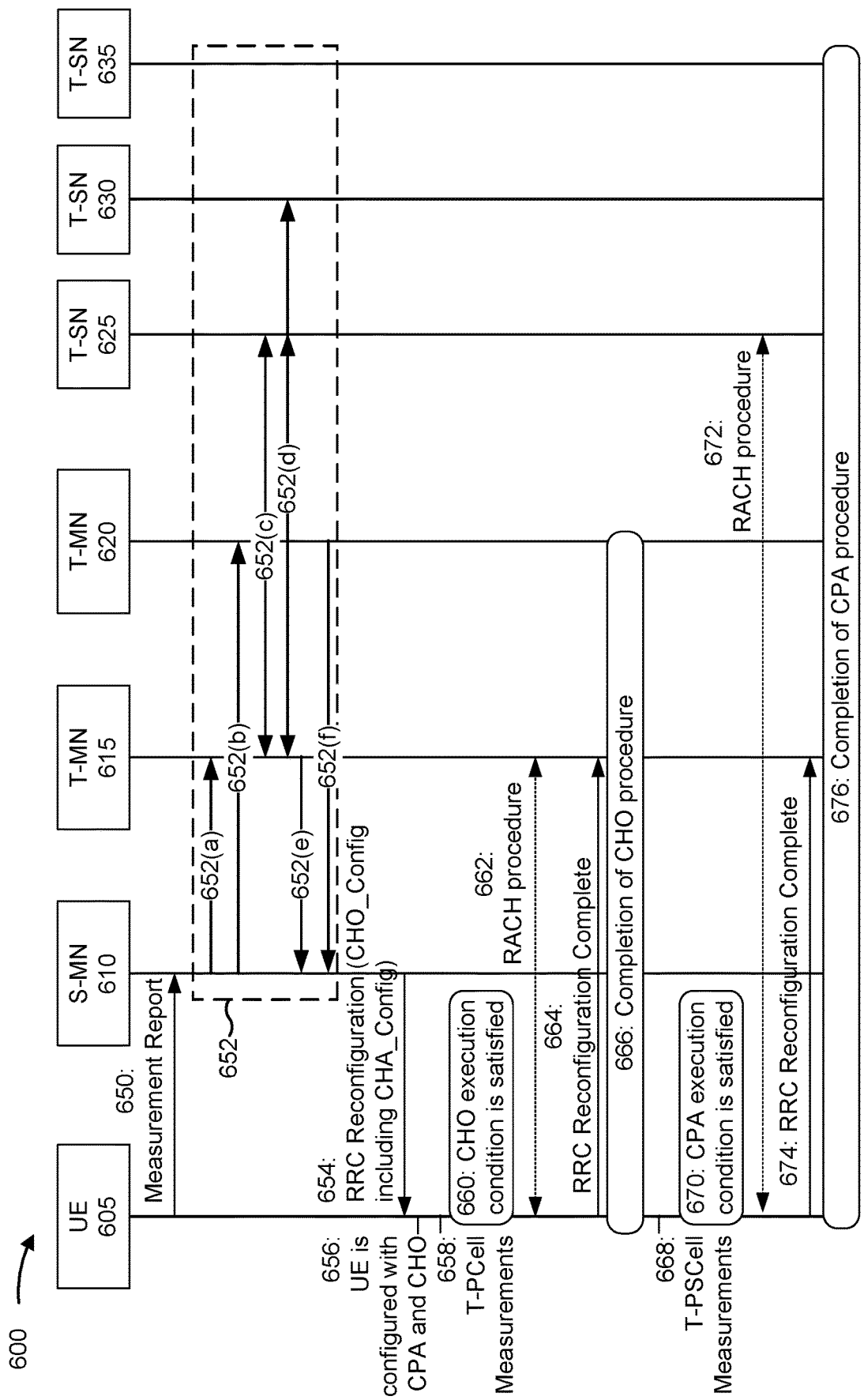

FIG. 6 is a diagram illustrating an example 600 associated with handling of CHO and CPAC, in accordance with the present disclosure. As shown in FIG. 6, a UE 605, an S-MN 610, a first T-MN 615, a second T-MN 620, a first T-SN 625, a second T-SN 630, and a third T-SN 635 may communicate with each other.

As shown by reference number 650, UE 605 may transmit a measurement report to S-MN 610. For example, UE 605 may transmit a measurement report associated with triggering a CHO procedure. As shown by reference number 652, S-MN 610, T-MNs 615 and 620, and T-SNs 625 and 630 may communicate to prepare for the CHO procedure and the CPA procedure. For example, at 652(a) and 652(b), S-MN 610 may transmit handover requests to T-MN 615 and T-MN 620, respectively. At 652(c) and 652(d), first T-MN 615 may perform CPA preparation with first T-SN 625, and second T-MN 620 may perform CPA preparation with second T-SN 630 and third T-SN 635, respectively. At 652(e) and 652(f), S-MN 610 may receive handover request acknowledgements, which may include CPA configuration information, from first T-MN 615 and second T-MN 620, respectively. As shown by reference number 654, S-MN 610 may transmit a reconfiguration message to UE 605. For example, S-MN 610 may transmit an RRC reconfiguration message that includes a CHO configuration that includes a CPA configuration based at least in part on preparing for the CHO procedure and the CPA procedure. Additional details regarding CHO preparation and CPA preparation are described with regard to FIG. 7. As shown by reference number 656, based at least in part on receiving the reconfiguration message from S-MN 610 with the CHO configuration and CPA configuration, UE 605 may store CHO configuration information and CPA configuration information and, as shown by reference number 658, measure T-PCells for satisfaction of a condition associated with triggering a CHO procedure or a CPA procedure.

As shown by reference number 660, UE 605 may determine that a CHO procedure execution condition is satisfied for a T-PCell. For example, UE 605 may determine to trigger a CHO procedure to handover between master nodes. As shown by reference number 662, UE 605 may communicate with first T-MN 615 to perform a RACH procedure on the T-PCell. For example, UE 605 may transmit a message to T-MN 615 to initiate a handover to the T-PCell. As shown by reference number 664, UE 605 may transmit an RRC reconfiguration complete message to S-MN 610. For example, based at least in part on performing the RACH procedure, UE 605 may transmit an RRC reconfiguration complete message, which may correspond to the RRC reconfiguration message that included the CHO configuration information. In this case, as shown by reference number 666, as a response to transmitting/receiving the RRC reconfiguration complete message and the handover success message, UE 605, S-MN 610, and T-MNs 615 and 620 may communicate to complete one or more further steps of the CHO procedure.

As shown by reference number 668, UE 605 may measure T-PSCells and, as shown by reference number 670, determine that a CPA execution condition is satisfied for a particular T-PSCell (corresponding to first T-SN 625). For example, UE 605 may determine to trigger a CPA procedure. As shown by reference number 672, UE 605 may perform a RACH procedure on the particular T-PSCell of first T-SN 625. As shown by reference number 674, UE 605 may transmit an RRC reconfiguration complete message to first T-MN 615 (to which UE 605 previously handed over). For example, based at least in part on performing the RACH procedure with respect to the particular T-PSCell of first T-SN 625, UE 605 may transmit an RRC reconfiguration complete message, which may correspond to the RRC reconfiguration message that included the CHO configuration information that included the CPA configuration information. As shown by reference number 676, as a response to receiving the RRC reconfiguration complete message, UE 605, first T-MN 615, and/or one or more T-SNs 625, 630, and 635 may perform one or more procedures to complete CPA execution.

As indicated above, FIG. 6 is provided as an example. Other examples may differ from what is described with respect to FIG. 6.

Figure 7:
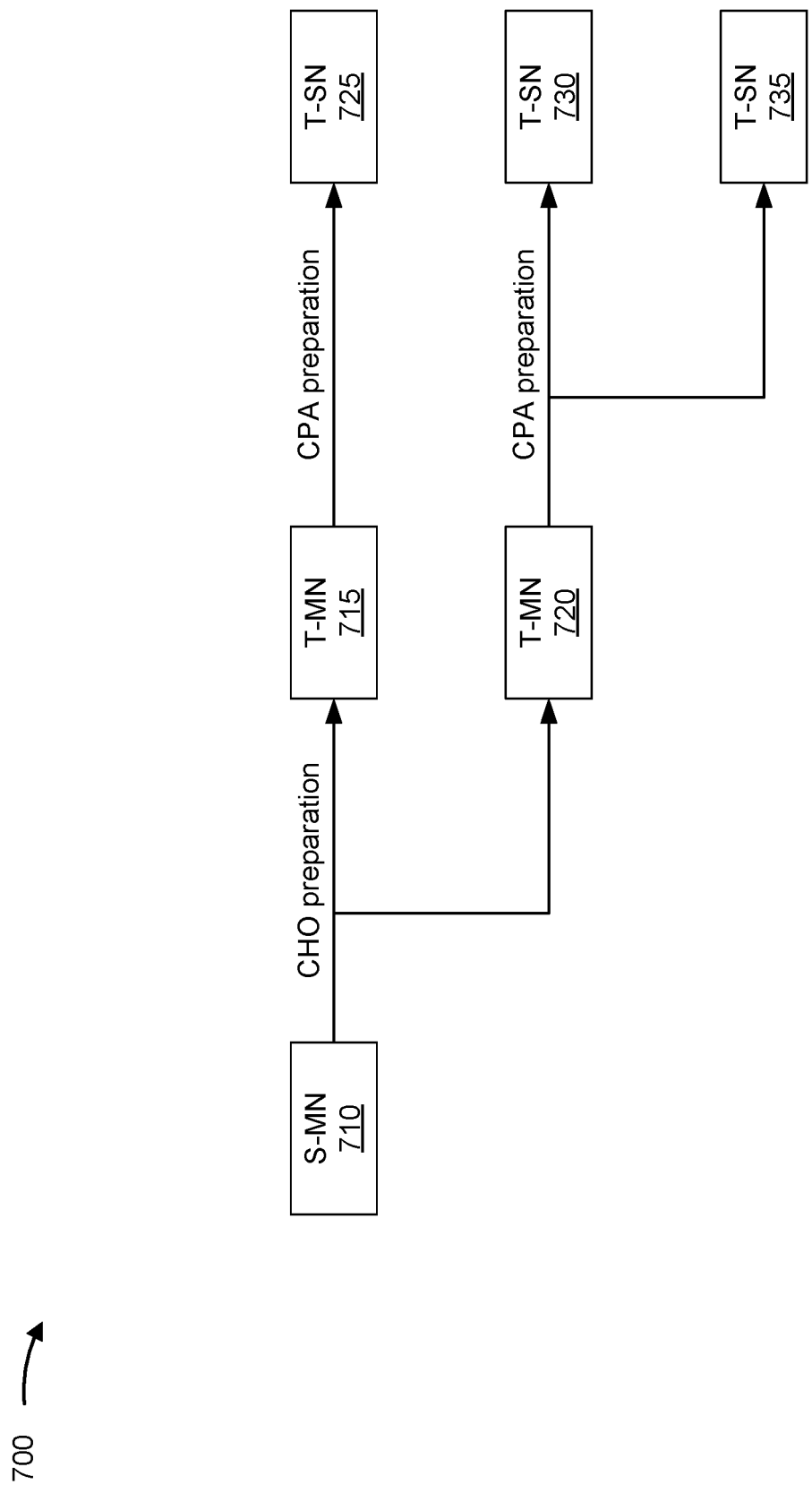

FIG. 7 is a diagram illustrating an example 700 associated with handling of CHO and CPAC, in accordance with the present disclosure. As shown in FIG. 7, an S-MN 710, a first T-MN 715, a second T-MN 720, a first T-SN 725, a second T-SN 730, and a third T-SN 735 may communicate with each other.

As shown in example 700, and with regard to the procedure of example 600, when S-MN 710 triggers CHO preparation (e.g., by transmitting handover requests to T-MNs 715 and 720), each T-MN triggers CPA preparation. For example, first T-MN 715 triggers CPA preparation for first T-SN 725. Additionally, or alternatively, second T-MN 720 triggers CPA preparation for second T-SN 730 and third T-SN 735.

As indicated above, FIG. 7 is provided as an example. Other examples may differ from what is described with respect to FIG. 7.

Figure 8:
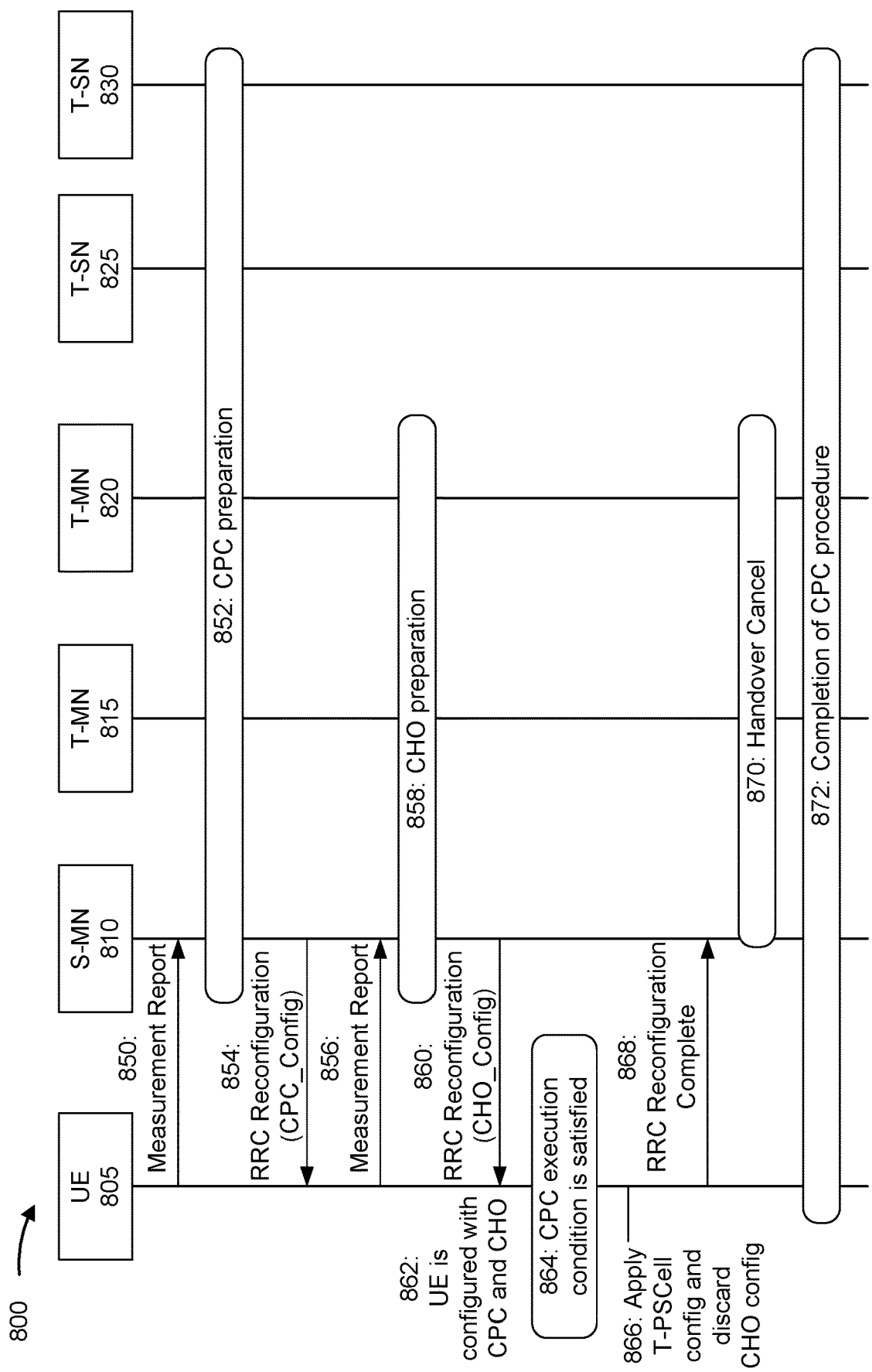

FIG. 8 is a diagram illustrating an example 800 associated with handling of CHO and CPAC, in accordance with the present disclosure. As shown in FIG. 8, a UE 805, an S-MN 810, a first T-MN 815, a second T-MN 820, a first target T-SN 825, and a second T-SN 830 may communicate with each other.

As shown by reference number 850, UE 805 may transmit a measurement report associated with triggering a CPC procedure to S-MN 810. As shown by reference number 852, S-MN 810, T-MNs 815 and 820, and T-SNs 825 and 830 may communicate to prepare for the CPC procedure. As shown by reference number 854, S-MN 810 may transmit an RRC reconfiguration message to UE 805 that includes a CPC configuration based at least in part on preparing for the CPC procedure.

As shown by reference number 856, UE 805 may transmit a measurement report associated with triggering a CHO procedure to S-MN 810. As shown by reference number 858, S-MN 810 and T-MNs 815 and 820 may communicate to prepare for the CHO procedure. As shown by reference number 860, S-MN 810 may transmit a reconfiguration message including a CHO configuration to UE 805 based at least in part on preparing for the CHO procedure. As shown by reference number 862, based at least in part on receiving the reconfiguration messages from S-MN 810 with the CPC configuration and CHO configuration, UE 805 may store CPC configuration information and CHO configuration information and monitor for satisfaction of a condition associated with triggering a CPC procedure or a CHO procedure.

As shown by reference number 864, UE 805 may determine that a CPC execution condition is satisfied. For example, UE 805 may determine to trigger a CPC procedure to change a T-PSCell. As shown by reference number 866, UE 805 may apply a configuration associated with the T-PSCell and may discard the CHO configuration. For example, UE 805 may apply a T-PSCell configuration, which may be included in the CPC configuration information, and may discard the CHO configuration information to avoid a conflict between subsequent CPC procedures and CHO procedures that could be triggered during the CPC procedures.

As shown by reference number 868, UE 805 may transmit an RRC reconfiguration complete message to S-MN 810. For example, based at least in part on applying the T-PSCell configuration, of the CPC configuration information, UE 805 may transmit an RRC reconfiguration complete message, which may correspond to the RRC reconfiguration message that included the CPC configuration information. In this case, the RRC reconfiguration complete message may include information indicating that the CPC procedure is initiated with respect to a particular T-PSCell.

As shown by reference number 870, as a response to receiving the RRC reconfiguration complete message, S-MN 810 may communicate with first T-MN 815 and/or second T-MN 820 to perform a handover cancellation procedure associated with the CHO procedure. As shown by reference number 872, as another response to transmitting/receiving the RRC reconfiguration complete message, UE 805, S-MN 810, T-MNs 815 and 820, and T-SNs 825 and 830 may communicate to complete one or more further steps of the CPC procedure.

As indicated above, FIG. 8 is provided as an example. Other examples may differ from what is described with respect to FIG. 8.

Figure 9:
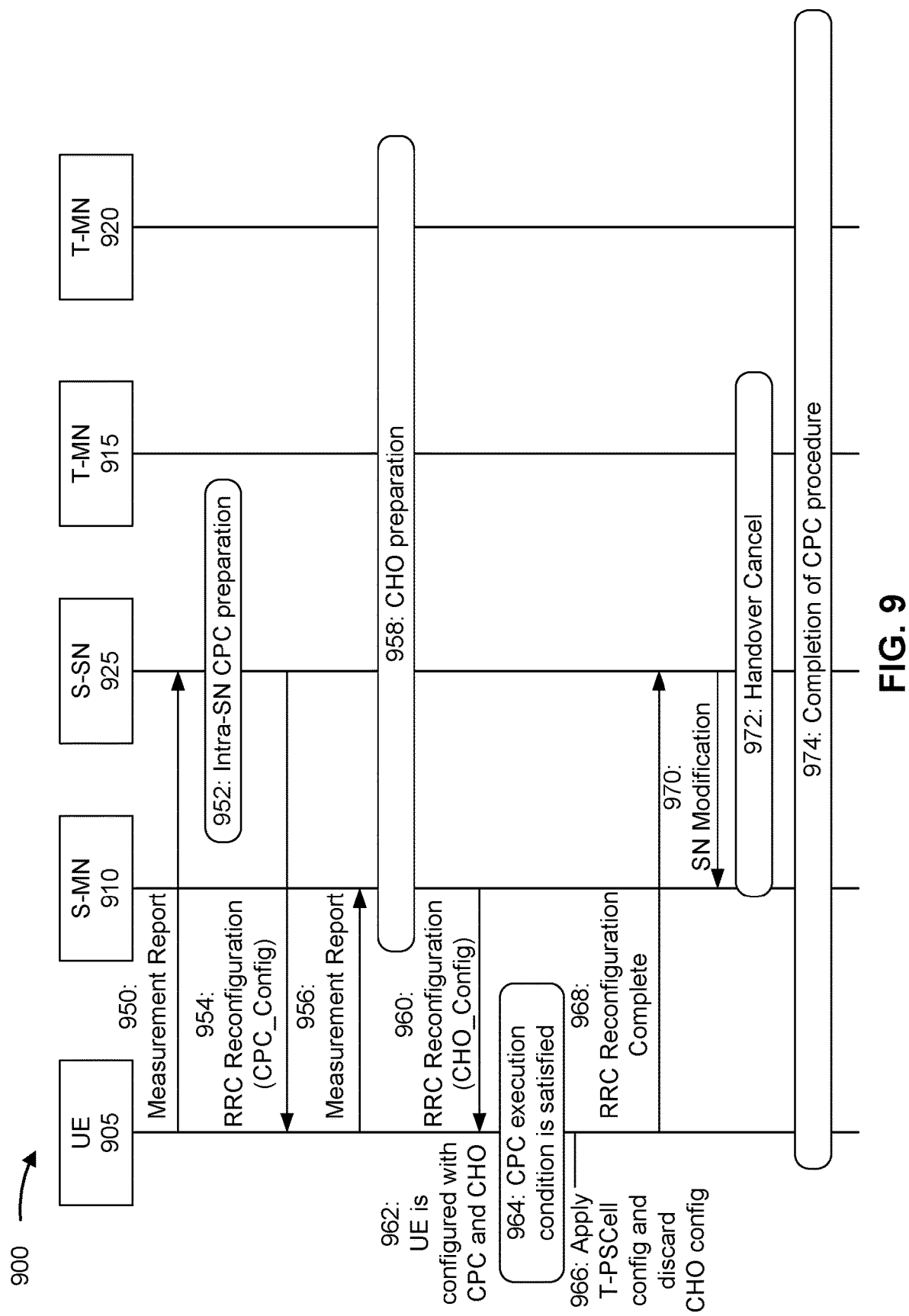

FIG. 9 is a diagram illustrating an example 900 associated with handling of CHO and CPAC, in accordance with the present disclosure. As shown in FIG. 9, a UE 905, an S-MN 910, a first T-MN 915, a second T-MN 920, an S-SN 925 may communicate with each other.

As shown by reference number 950, UE 905 may transmit a measurement report associated with triggering a procedure to S-SN 925. For example, UE 905 may transmit a measurement report associated with triggering an intra-secondary node (intra-SN) CPC procedure. As shown by reference number 952, S-SN 925 may prepare for the intra-SN CPC procedure. As shown by reference number 954, S-SN 925 may transmit an RRC reconfiguration message to UE 905 that includes a CPC configuration based at least in part on preparing for the intra-SN CPC procedure.

As shown by reference number 956, UE 905 may transmit a measurement report associated with triggering a CHO procedure to S-MN 910. As shown by reference number 958, S-MN 910 and T-MNs 915 and 920 may communicate to prepare for the CHO procedure. As shown by reference number 960, S-MN 910 may transmit a reconfiguration message including a CHO configuration to UE 905 based at least in part on preparing for the CHO procedure. As shown by reference number 962, based at least in part on receiving the reconfiguration messages from S-SN 925 and S-MN 910 with the CPC configuration and CHO configuration, respectively, UE 905 may store CPC configuration information and CHO configuration information and monitor for satisfaction of a condition associated with triggering a CPC procedure or a CHO procedure.

As shown by reference number 964, UE 905 may determine that a CPC execution condition is satisfied. For example, UE 905 may determine to trigger a CPC procedure to change a T-PSCell. As shown by reference number 966, UE 905 may apply a configuration associated with the T-PSCell and may discard the CHO configuration. For example, UE 905 may apply a T-PSCell configuration, which may be included in the CPC configuration information, and may discard the CHO configuration information to avoid a conflict between subsequent CPC procedures and CHO procedures that could be triggered during the CPC procedures.

As shown by reference number 968, UE 905 may transmit an RRC reconfiguration complete message to S-SN 925. For example, based at least in part on applying the T-PSCell configuration, of the CPC configuration information, UE 905 may transmit an RRC reconfiguration complete message, which may correspond to the RRC reconfiguration message that included the CPC configuration information. In this case, the RRC reconfiguration complete message may include information indicating that the CPC procedure is initiated with respect to a particular T-PSCell.

As shown by reference number 970, as a response to receiving the RRC reconfiguration complete message, S-SN 925 may transmit a secondary node (SN) modification request message to S-MN 910 to indicate a change to a PSCell and, as shown by reference number 972, S-MN 910 may communicate with first T-MN 915 and/or second T-MN 920 to perform a handover cancellation procedure associated with the CHO procedure. As shown by reference number 974, as another response to transmitting/receiving the RRC reconfiguration complete message, UE 905, S-MN 910, and S-SN 925 may communicate to complete one or more further steps of the CPC procedure.

As indicated above, FIG. 9 is provided as an example. Other examples may differ from what is described with respect to FIG. 9.

Figure 10:
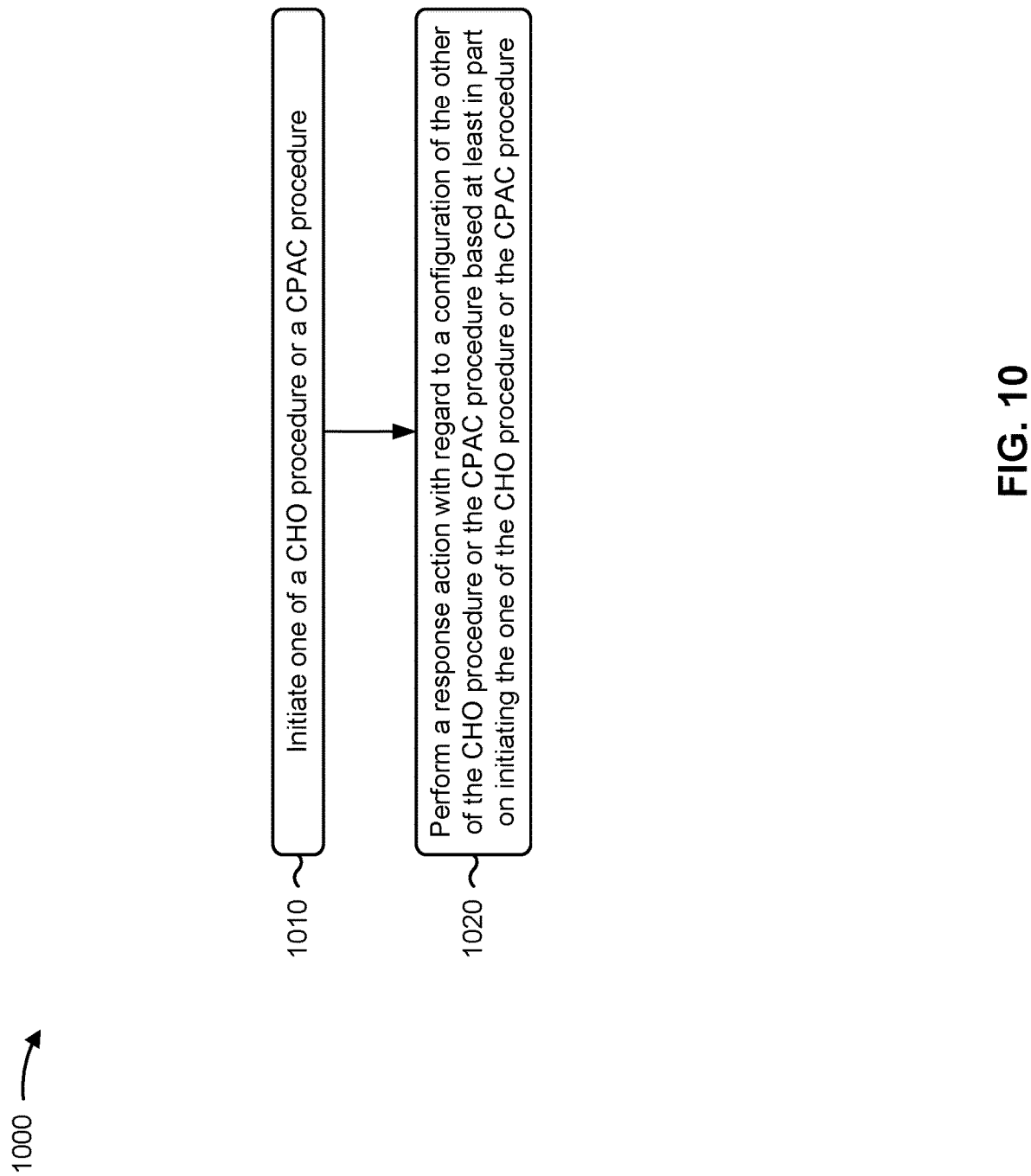
FIGS. 10-11 are diagrams illustrating example processes associated with handling of CHO and CPAC, in accordance with the present disclosure.

FIG. 10 is a diagram illustrating an example process 1000 performed, for example, by a UE, in accordance with the present disclosure. Example process 1000 is an example where the UE (e.g., UE 120 or one or more of the UEs of FIGS. 3 through 9) performs operations associated with handling of CHO and CPAC.

As shown in FIG. 10, in some aspects, process 1000 may include initiating one of a CHO procedure or a CPAC procedure (block 1010). For example, the UE (e.g., using initiation component 1208, depicted in FIG. 12) may initiate one of a CHO procedure or a CPAC procedure, as described above in connection with FIGS. 3 to 9.

As further shown in FIG. 10, in some aspects, process 1000 may include performing a response action with regard to a configuration of the other of the CHO procedure or the CPAC procedure based at least in part on initiating the one of the CHO procedure or the CPAC procedure (block 1020). For example, the UE (e.g., using performance component 1210, depicted in FIG. 12) may perform a response action with regard to a configuration of the other of the CHO procedure or the CPAC procedure based at least in part on initiating the one of the CHO procedure or the CPAC procedure, as described above in connection with FIGS. 3 to 9.

Process 1000 may include additional aspects, such as any single aspect or any combination of aspects described below and/or in connection with one or more other processes described elsewhere herein.

In a first aspect, the CPAC procedure is a CPA procedure or a CPC procedure.

In a second aspect, alone or in combination with the first aspect, process 1000 includes determining that a CPAC execution condition is satisfied, and initiating the CPAC procedure based at least in part on determining that the CPAC execution condition is satisfied.

In a third aspect, alone or in combination with one or more of the first and second aspects, process 1000 includes discarding a CHO configuration associated with the CHO procedure.

In a fourth aspect, alone or in combination with one or more of the first through third aspects, process 1000 includes transmitting a reconfiguration complete message to trigger a handover cancel and a release of reserved resources for the UE and a UE context for the UE.

In a fifth aspect, alone or in combination with one or more of the first through fourth aspects, process 1000 includes maintaining a CHO configuration associated with the CHO procedure, and forgoing one or more measurements associated with one or more target cells in connection with the CHO configuration associated with the CHO procedure.

In a sixth aspect, alone or in combination with one or more of the first through fifth aspects, process 1000 includes transmitting a reconfiguration complete message to cause a CHO modification, and receiving an updated CHO configuration based at least in part on transmitting the reconfiguration complete message to cause the CHO modification.

In a seventh aspect, alone or in combination with one or more of the first through sixth aspects, the CHO modification includes a multi-radio access technology dual connectivity (MR-DC) configuration as a source configuration.

In an eighth aspect, alone or in combination with one or more of the first through seventh aspects, process 1000 includes receiving an RRC reconfiguration message including a CHO configuration associated with the CHO procedure, wherein the RRC message includes an indicator of whether to maintain the CHO configuration for a set of target primary secondary cells when the CPAC procedure is triggered, and selecting whether to discard or maintain the CHO configuration based at least in part on the indicator.

In a ninth aspect, alone or in combination with one or more of the first through eighth aspects, process 1000 includes determining that a CHO procedure execution condition is satisfied, and initiating the CHO procedure based at least in part on determining that the CHO procedure execution condition is satisfied.

In a tenth aspect, alone or in combination with one or more of the first through ninth aspects, process 1000 includes discarding a CPAC configuration associated with the CPAC procedure.

In an eleventh aspect, alone or in combination with one or more of the first through tenth aspects, process 1000 includes completing a secondary node release procedure in connection with a handover success message.

In a twelfth aspect, alone or in combination with one or more of the first through eleventh aspects, process 1000 includes determining that a CHO procedure execution condition and a CPAC procedure execution condition are satisfied, and initiating the CHO procedure based at least in part on determining that the CHO procedure execution condition and the CPAC procedure execution condition are satisfied.

In a thirteenth aspect, alone or in combination with one or more of the first through twelfth aspects, process 1000 includes performing a set of measurements on a set of target primary cells configured for the CHO procedure, selecting a target primary cell, of the set of target primary cells, based at least in part on the set of measurements, communicating with the target primary cell to access the target primary cell, performing a set of measurements on a set of target primary secondary cells based at least in part on accessing the target primary cell, adding or changing a target primary secondary cell, of the set of target primary secondary cells configured for the CPAC procedure, based at least in part on the set of measurements and a selection procedure; and communicating with the target primary secondary cell to access the target primary secondary cell.

In a fourteenth aspect, alone or in combination with one or more of the first through thirteenth aspects, process 1000 includes applying a target primary secondary cell configuration, and discarding a CHO configuration based at least in part on applying the target primary secondary cell configuration.

In a fifteenth aspect, alone or in combination with one or more of the first through fourteenth aspects, process 1000 includes discarding an intra-SN CPC configuration associated with the CPC procedure.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
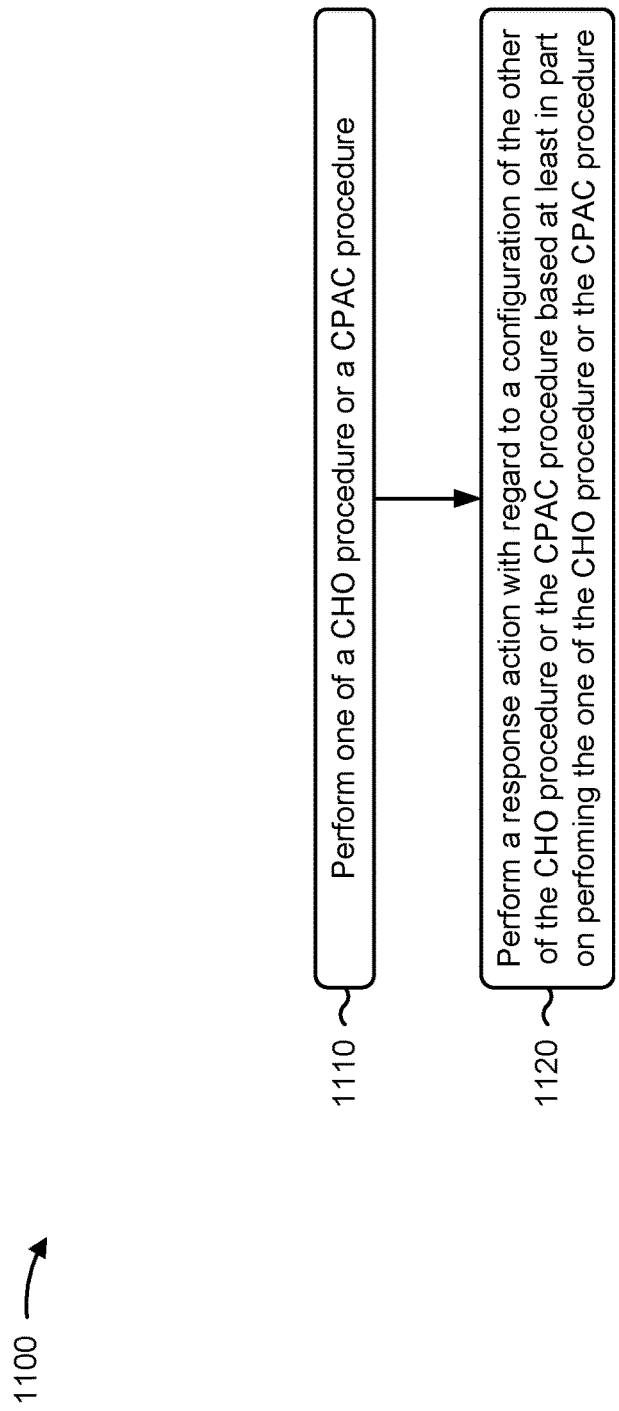

FIG. 11 is a diagram illustrating an example process 1100 performed, for example, by a wireless node, in accordance with the present disclosure. Example process 1100 is an example where the wireless node (e.g., base station 110 or one or more of the nodes of FIGS. 3 through 9) performs operations associated with handling of CHO and CPC.

As shown in FIG. 11, in some aspects, process 1100 may include performing one of a CHO procedure or a CPAC procedure (block 1110). For example, the wireless node (e.g., using initiation component 1308, depicted in FIG. 13) may perform one of a CHO procedure or a CPAC procedure, as described above in connection with FIGS. 3 to 9.

As further shown in FIG. 11, in some aspects, process 1100 may include performing a response action with regard to a configuration of the other of the CHO procedure or the CPAC procedure based at least in part on performing the one of the CHO procedure or the CPAC procedure (block 1120). For example, the wireless node (e.g., using performance component 1310, depicted in FIG. 13) may perform a response action with regard to a configuration of the other of the CHO procedure or the CPAC procedure based at least in part on performing the one of the CHO procedure or the CPAC procedure, as described above in connection with FIGS. 3 to 9.

Process 1100 may include additional aspects, such as any single aspect or any combination of aspects described below and/or in connection with one or more other processes described elsewhere herein.

In a first aspect, the CPAC procedure is a CPA procedure or a CPC procedure.

In a second aspect, alone or in combination with the first aspect, process 1100 includes determining that a CPAC execution condition is satisfied, and initiating the CPAC procedure based at least in part on determining that the CPAC execution condition is satisfied.

In a third aspect, alone or in combination with one or more of the first and second aspects, process 1100 includes receiving a reconfiguration complete message, and triggering a handover cancel and a release of reserved resources for a UE and a UE context for the UE based at least in part on receiving the reconfiguration complete message.

In a fourth aspect, alone or in combination with one or more of the first through third aspects, process 1100 includes receiving a reconfiguration complete message, triggering a CHO modification with a set of target master nodes based at least in part on receiving the reconfiguration complete, and providing an updated CHO configuration based at least in part on triggering the CHO modification.

In a fifth aspect, alone or in combination with one or more of the first through fourth aspects, the CHO modification includes an MR-DC configuration as a source configuration.

In a sixth aspect, alone or in combination with one or more of the first through fifth aspects, process 1100 includes transmitting an RRC reconfiguration message including a CHO configuration associated with the CHO procedure, wherein the RRC message includes an indicator of whether to maintain the CHO configuration for a set of target primary secondary cells when the CPAC procedure is triggered.

In a seventh aspect, alone or in combination with one or more of the first through sixth aspects, process 1100 includes determining that a CHO procedure execution condition is satisfied, and performing the CHO procedure based at least in part on determining that the CHO procedure execution condition is satisfied.

In an eighth aspect, alone or in combination with one or more of the first through seventh aspects, process 1100 includes identifying a handover success based at least in part on receiving a handover success message, and performing one or more secondary node release procedures.

In a ninth aspect, alone or in combination with one or more of the first through eighth aspects, process 1100 includes determining that a CHO procedure execution condition and a CPAC procedure execution condition are satisfied, and performing the CHO procedure based at least in part on determining that the CHO procedure execution condition and the CPAC procedure execution condition are satisfied.

In a tenth aspect, alone or in combination with one or more of the first through ninth aspects, process 1100 includes performing an access and handover procedure to a selected target primary cell of a set of target primary cells configured for the CHO procedure; and performing an access and primary secondary cell addition or change procedure to a selected target primary secondary cell of a set of target primary secondary cells configured for the CPAC procedure.

In an eleventh aspect, alone or in combination with one or more of the first through tenth aspects, process 1100 includes receiving an indication of a configuration of an intra-SN CPC associated with the CPC procedure, and triggering a release of reserved resources based at least in part on receiving the indication of the configuration of the intra-SN CPC.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
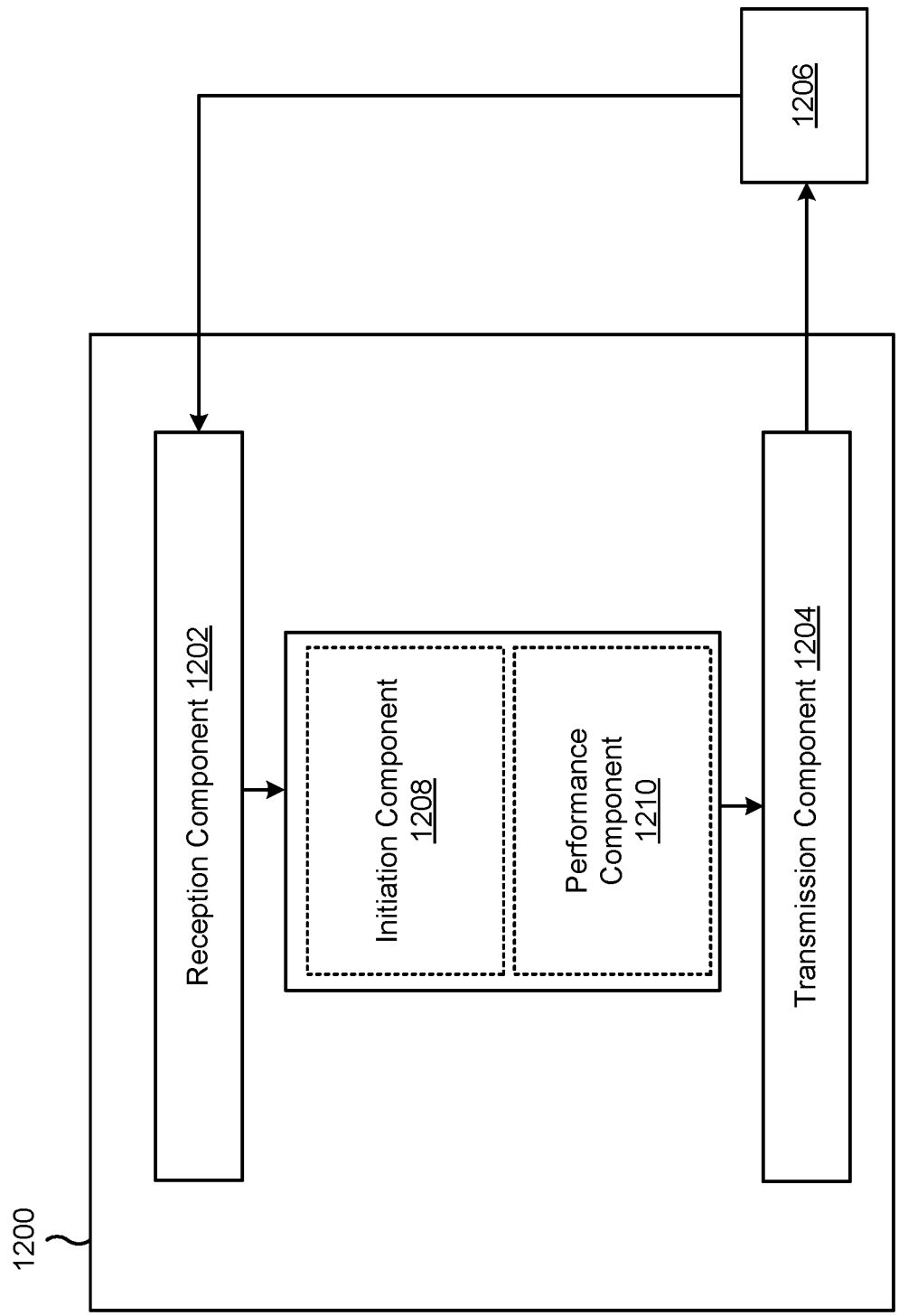
FIGS. 12-13 are block diagrams of example apparatuses for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of an initiation component 1208 or a performance component 1210, among other examples.

In some aspects, the apparatus 1200 may be configured to perform one or more operations described herein in connection with FIGS. 3-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The initiation component 1208 may perform one of a CHO procedure or a CPAC procedure. The performance component 1210 may perform a response action with regard to a configuration of the other of the CHO procedure or the CPAC procedure based at least in part on initiating the one of the CHO procedure or the CPAC procedure.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
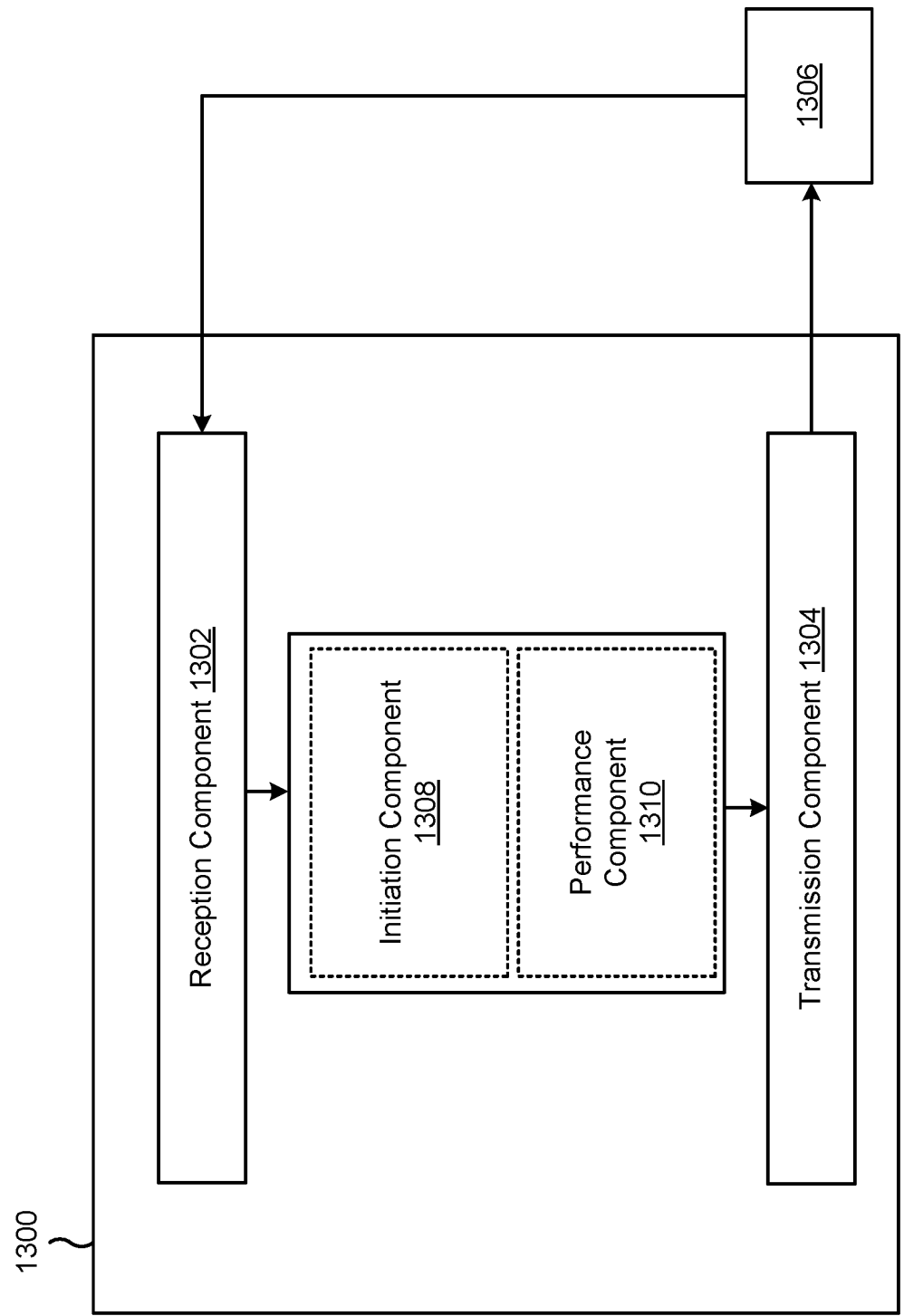

FIG. 13 is a block diagram of an example apparatus 1300 for wireless communication. The apparatus 1300 may be a wireless node, or a wireless node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of an initiation component 1308 or a performance component 1310, among other examples.

In some aspects, the apparatus 1300 may be configured to perform one or more operations described herein in connection with FIGS. 3-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the wireless node described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the wireless node described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the wireless node described above in connection with FIG. 2. In some aspects, the transmission component 1304 may be co-located with the reception component 1302 in a transceiver.

The performance component 1310 may perform one of a CHO procedure or a CPAC procedure. The performance component 1310 may perform a response action with regard to a configuration of the other of the CHO procedure or the CPAC procedure based at least in part on initiating the one of the CHO procedure or the CPAC procedure. The initiation component 1308 may enable initiation of one of the CHO procedure or the CPAC procedure.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: initiating one of a conditional handover (CHO) procedure or a conditional primary secondary cell addition/change (CPAC) procedure; and performing a response action with regard to a configuration of the other of the CHO procedure or the CPAC procedure based at least in part on initiating the one of the CHO procedure or the CPAC procedure.

Aspect 2: The method of Aspect 1, wherein the CPAC procedure is a conditional primary secondary cell addition (CPA) procedure or a conditional primary secondary cell change (CPC) procedure.

Aspect 3: The method of any of Aspects 1 to 2, comprising: determining that a CPAC execution condition is satisfied; and initiating the CPAC procedure based at least in part on determining that the CPAC execution condition is satisfied.

Aspect 4: The method of Aspect 3, comprising: discarding a CHO configuration associated with the CHO procedure.

Aspect 5: The method of any of Aspects 3 to 4, further comprising: transmitting a reconfiguration complete message to trigger a handover cancel and a release of reserved resources for the UE and a UE context for the UE.

Aspect 6: The method of any of Aspects 3 to 5, comprising: maintaining a CHO configuration associated with the CHO procedure; and forgoing one or more measurements associated with one or more target cells in connection with the CHO configuration associated with the CHO procedure.

Aspect 7: The method of Aspect 6, further comprising: transmitting a reconfiguration complete message to cause a CHO modification; and receiving an updated CHO configuration based at least in part on transmitting the reconfiguration complete message to cause the CHO modification.

Aspect 8: The method of Aspect 7, wherein the CHO modification includes a multi-radio access technology dual connectivity (MR-DC) configuration as a source configuration.

Aspect 9: The method of any of Aspects 3 to 8, further comprising: receiving a radio resource control (RRC) reconfiguration message including a CHO configuration associated with the CHO procedure, wherein the RRC message includes an indicator of whether to maintain the CHO configuration for a set of target primary secondary cells when the CPAC procedure is triggered; and selecting whether to discard or maintain the CHO configuration based at least in part on the indicator.

Aspect 10: The method of Aspect 1, comprising: determining that a CHO procedure execution condition is satisfied; and initiating the CHO procedure based at least in part on determining that the CHO procedure execution condition is satisfied.

Aspect 11: The method of Aspect 10, comprising: discarding a CPAC configuration associated with the CPAC procedure.

Aspect 12: The method of Aspect 11, further comprising: completing a secondary node release procedure in connection with a handover success message.

Aspect 13: The method of any of Aspects 1 to 12, comprising: determining that a CHO procedure execution condition and a CPAC procedure execution condition are satisfied; and initiating the CHO procedure based at least in part on determining that the CHO procedure execution condition and the CPAC procedure execution condition are satisfied.

Aspect 14: The method of any of Aspects 1 to 13, comprising: performing a set of measurements on a set of target primary cells configured for the CHO procedure; selecting a target primary cell, of the set of target primary cells, based at least in part on the set of measurements; communicating with the target primary cell to access the target primary cell; performing a set of measurements on a set of target primary secondary cells based at least in part on accessing the target primary cell; adding or changing a target primary secondary cell, of the set of target primary secondary cells configured for the CPAC procedure, based at least in part on the set of measurements and a selection procedure; and communicating with the target primary secondary cell to access the target primary secondary cell.

Aspect 15: The method of any of Aspects 1 to 14, comprising: applying a target primary secondary cell configuration; and discarding a CHO configuration based at least in part on applying the target primary secondary cell configuration.

Aspect 16: The method of any of Aspects 1 to 15, comprising: discarding an intra-secondary node (SN) conditional primary secondary cell change (CPC) configuration associated with the conditional primary secondary cell change (CPC) procedure.

Aspect 17: A method of wireless communication performed by a wireless node, comprising: performing one of a conditional handover (CHO) procedure or a conditional primary secondary cell addition/change (CPAC) procedure; and performing a response action with regard to a configuration of the other of the CHO procedure or the CPAC procedure based at least in part on performing the one of the CHO procedure or the CPAC procedure.

Aspect 18: The method of Aspect 17, wherein the CPAC procedure is a conditional primary secondary cell addition (CPA) procedure or a conditional primary secondary cell change (CPC) procedure.

Aspect 19: The method of any of Aspects 17 to 18, comprising: determining that a CPAC execution condition is satisfied; and performing the CPAC procedure based at least in part on determining that the CPAC execution condition is satisfied.

Aspect 20: The method of Aspect 19, further comprising: receiving a reconfiguration complete message; and triggering a handover cancel and a release of reserved resources for a user equipment (UE) and a UE context for the UE based at least in part on receiving the reconfiguration complete message.

Aspect 21: The method of any of Aspects 19 to 20, further comprising: receiving a reconfiguration complete message; triggering a CHO modification with a set of target master nodes based at least in part on receiving the reconfiguration complete; and providing an updated CHO configuration based at least in part on triggering the CHO modification.

Aspect 22: The method of Aspect 21, wherein the CHO modification includes a multi-radio access technology dual connectivity (MR-DC) configuration as a source configuration.

Aspect 23: The method of any of Aspects 19 to 22, further comprising: transmitting a radio resource control (RRC) reconfiguration message including a CHO configuration associated with the CHO procedure, wherein the RRC message includes an indicator of whether to maintain the CHO configuration for a set of target primary secondary cells when the CPAC procedure is triggered.

Aspect 24: The method of Aspect 17, comprising: determining that a CHO procedure execution condition is satisfied; and performing the CHO procedure based at least in part on determining that the CHO procedure execution condition is satisfied.

Aspect 25: The method of Aspect 24, comprising: identifying a handover success based at least in part on receiving a handover success message; and performing one or more secondary node release procedures.

Aspect 26: The method of any of Aspects 17 to 25, comprising: determining that a CHO procedure execution condition and a CPAC procedure execution condition are satisfied; and performing the CHO procedure based at least in part on determining that the CHO procedure execution condition and the CPAC procedure execution condition are satisfied.

Aspect 27: The method of any of Aspects 17 to 26, comprising: performing an access and handover procedure to a selected target primary cell of a set of target primary cells configured for the CHO procedure; and performing an access and primary secondary cell addition or change procedure to a selected target primary secondary cell of a set of target primary secondary cells configured for the CPAC procedure.

Aspect 28: The method of any of Aspects 17 to 27, comprising: receiving an indication of a configuration of an intra-secondary node (SN) conditional primary secondary cell change (CPC) associated with the conditional primary secondary cell change (CPC) procedure; and triggering a release of reserved resources based at least in part on receiving the indication of the configuration of the intra-SN CPC.

Aspect 29: An apparatus for wireless communication at a device, comprising a processor; memory coupled with the processor; and instructions stored in the memory and executable by the processor to cause the apparatus to perform the method of one or more Aspects of Aspects 1-16.

Aspect 30: A device for wireless communication, comprising a memory and one or more processors coupled to the memory, the memory and the one or more processors configured to perform the method of one or more Aspects of Aspects 1-16.

Aspect 31: An apparatus for wireless communication, comprising at least one means for performing the method of one or more Aspects of Aspects 1-16.

Aspect 32: A non-transitory computer-readable medium storing code for wireless communication, the code comprising instructions executable by a processor to perform the method of one or more Aspects of Aspects 1-16.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-16.

Aspect 34: An apparatus for wireless communication at a device, comprising a processor; memory coupled with the processor; and instructions stored in the memory and executable by the processor to cause the apparatus to perform the method of one or more Aspects of Aspects 17-28.

Aspect 35: A device for wireless communication, comprising a memory and one or more processors coupled to the memory, the memory and the one or more processors configured to perform the method of one or more Aspects of Aspects 17-28.

Aspect 36: An apparatus for wireless communication, comprising at least one means for performing the method of one or more Aspects of Aspects 17-28.

Aspect 37: A non-transitory computer-readable medium storing code for wireless communication, the code comprising instructions executable by a processor to perform the method of one or more Aspects of Aspects 17-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 17-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors, coupled to the memory, configured to:
      initiate one of a conditional handover (CHO) procedure or a conditional primary secondary cell addition/change (CPAC) procedure when the UE is configured with a CHO configuration and a CPAC configuration; and discard the CHO configuration or cause a CHO modification based at least in part on:
    initiating the one of the CHO procedure or the CPAC procedure, and
    the CPAC procedure being triggered before the CHO procedure; or discard the CPAC configuration based at least in part on:
    initiating the one of the CHO procedure or the CPAC procedure, and
    the CHO procedure being triggered before the CPAC procedure.

2. The UE of claim 1, wherein the CPAC procedure is a conditional primary secondary cell addition (CPA) procedure or a conditional primary secondary cell change (CPC) procedure.

3. The UE of claim 1, wherein the one or more processors, to initiate the one of the CHO procedure or the CPAC procedure, are configured to:
    determine that a CPAC execution condition is satisfied; and
    initiate the CPAC procedure based at least in part on determining that the CPAC execution condition is satisfied.

4. The UE of claim 1, wherein the CHO configuration is discarded.

5. The UE of claim 1, wherein the one or more processors are further configured to:
    transmit a reconfiguration complete message to trigger a handover cancel and a release of reserved resources for the UE and a UE context for the UE.

6. The UE of claim 1, wherein the one or more processors are further configured to:
    forgo one or more measurements associated with one or more target cells in connection with the CHO configuration.

7. The UE of claim 1, wherein the one or more processors, to discard the CHO configuration or cause the CHO modification, are configured to:
    transmit a reconfiguration complete message to cause the CHO modification; and
    receive an updated CHO configuration based at least in part on transmitting the reconfiguration complete message to cause the CHO modification.

8. The UE of claim 1, wherein the CHO modification includes a multi-radio access technology dual connectivity (MR-DC) configuration as a source configuration.

9. The UE of claim 1, wherein the one or more processors are further configured to:
    receive a radio resource control (RRC) reconfiguration message including the CHO configuration, wherein the RRC message includes an indicator of whether to maintain the CHO configuration for a set of target primary secondary cells when the CPAC procedure is triggered; and
    select whether to discard or maintain the CHO configuration based at least in part on the indicator.

10. The UE of claim 1, wherein the one or more processors, to initiate the one of the CHO procedure or the CPAC procedure, are configured to:
    determine that a CHO procedure execution condition is satisfied; and
    initiate the CHO procedure based at least in part on determining that the CHO procedure execution condition is satisfied.

11. The UE of claim 1, the CPAC configuration is discarded.

12. The UE of claim 1, wherein the one or more processors are further configured to:
    complete a secondary node release procedure in connection with a handover success message.

13. The UE of claim 1, wherein the one or more processors, to initiate the one of the CHO procedure or the CPAC procedure, are configured to:
    determine that a CHO procedure execution condition and a CPAC procedure execution condition are satisfied; and
    initiate the CHO procedure based at least in part on determining that the CHO procedure execution condition and the CPAC procedure execution condition are satisfied.

14. The UE of claim 1, wherein the one or more processors are configured to:
    perform a set of measurements on a set of target primary cells configured for the CHO procedure;
    select a target primary cell, of the set of target primary cells, based at least in part on the set of measurements;
    communicate with the target primary cell to access the target primary cell;
    perform a set of measurements on a set of target primary secondary cells based at least in part on accessing the target primary cell;
    add or change a target primary secondary cell, of the set of target primary secondary cells configured for the CPAC procedure, based at least in part on the set of measurements and a selection procedure; and
    communicate with the target primary secondary cell to access the target primary secondary cell.

15. The UE of claim 1, wherein the CHO configuration is discarded further based at least in part on applying a target primary secondary cell configuration.

16. The UE of claim 1, wherein the one or more processors are further configured to:
    discard an intra-secondary node (SN) conditional primary secondary cell change (CPC) configuration associated with a CPC procedure.

17. A wireless node for wireless communication, comprising:
    memory; and
    one or more processors, coupled to the memory, configured to:
        perform one of a conditional handover (CHO) procedure or a conditional primary secondary cell addition/change (CPAC) procedure; and
        discard a CHO configuration or cause a CHO modification based at least in part on:
            performing the one of the CHO procedure or the CPAC procedure, and
            the CPAC procedure being triggered before the CHO procedure; or
        discard a CPAC configuration based at least in part on:
            performing the one of the CHO procedure or the CPAC procedure, and
            the CHO procedure being triggered before the CPAC procedure.

18. The wireless node of claim 17, wherein the CPAC procedure is a conditional primary secondary cell addition (CPA) procedure or a conditional primary secondary cell change (CPC) procedure.

19. The wireless node of claim 17, wherein the one or more processors, to perform the one of the CHO procedure or the CPAC procedure, are configured to:
    determine that a CPAC execution condition is satisfied; and perform the CPAC procedure based at least in part on determining that the CPAC execution condition is satisfied.

20. The wireless node of claim 19, wherein the one or more processors are further configured to:
receive a reconfiguration complete message; and
trigger a handover cancel and a release of reserved resources for a user equipment (UE) and a UE context for the UE based at least in part on receiving the reconfiguration complete message.

21. The wireless node of claim 19, wherein the one or more processors are further configured to:
receive a reconfiguration complete message;
trigger the CHO modification with a set of target master nodes based at least in part on receiving the reconfiguration complete message; and
provide an updated CHO configuration based at least in part on triggering the CHO modification.

22. The wireless node of claim 17, wherein the CHO modification includes a multi-radio access technology dual connectivity (MR-DC) configuration as a source configuration.

23. The wireless node of claim 19, wherein the one or more processors are further configured to:
transmit a radio resource control (RRC) reconfiguration message including a CHO configuration associated with the CHO procedure, wherein the RRC message includes an indicator of whether to maintain the CHO configuration for a set of target primary secondary cells when the CPAC procedure is triggered.

24. The wireless node of claim 17, wherein the one or more processors, to perform the one of the CHO procedure or the CPAC procedure, are configured to:
determine that a CHO procedure execution condition is satisfied; and
perform the CHO procedure based at least in part on determining that the CHO procedure execution condition is satisfied.

25. The wireless node of claim 17, wherein the one or more processors are further configured to:
identify a handover success based at least in part on receiving a handover success message; and
perform one or more secondary node release procedures.

26. The wireless node of claim 17, wherein the one or more processors, to perform the one of the CHO procedure or the CPAC procedure, are configured to:
determine that a CHO procedure execution condition and a CPAC procedure execution condition are satisfied; and
perform the CHO procedure based at least in part on determining that the CHO procedure execution condition and the CPAC procedure execution condition are satisfied.

27. The wireless node of claim 17, wherein the one or more processors are further configured to:
perform an access and handover procedure to a selected target primary cell of a set of target primary cells configured for the CHO procedure; and
perform an access and primary secondary cell addition or change procedure to a selected target primary secondary cell of a set of target primary secondary cells configured for the CPAC procedure.

28. The wireless node of claim 17, wherein the one or more processors are configured to:
receive an indication of a configuration of an intra-secondary node (SN) conditional primary secondary cell change (CPC) associated with a CPC procedure; and
trigger a release of reserved resources based at least in part on receiving the indication of the configuration of the intra-SN CPC.

29. A method of wireless communication performed by a user equipment (UE), comprising:
initiating one of a conditional handover (CHO) procedure or a conditional primary secondary cell addition/change (CPAC) procedure when the UE is configured with a CHO configuration and a CPAC configuration; and
discarding the CHO configuration or causing a CHO modification based at least in part on:
initiating the one of the CHO procedure or the CPAC procedure, and
the CPAC procedure being triggered before the CHO procedure, or
discarding a CPAC configuration based at least in part on:
initiating the one of the CHO procedure or the CPAC procedure, and
the CHO procedure being triggered before the CPAC procedure.

30. A method of wireless communication performed by a wireless node, comprising:
performing one of a conditional handover (CHO) procedure or a conditional primary secondary cell addition/change (CPAC) procedure; and
discarding a CHO configuration or causing a CHO modification based at least in part on:
performing the one of the CHO procedure or the CPAC procedure, and
the CPAC procedure being triggered before the CHO procedure, or
discarding a CPAC configuration based at least in part on:
performing the one of the CHO procedure or the CPAC procedure, and
the CHO procedure being triggered before the CPAC procedure.

* * * * *